(12) United States Patent
Iwahara et al.

(10) Patent No.: US 12,120,441 B2
(45) Date of Patent: Oct. 15, 2024

(54) IMAGE CAPTURING APPARATUS WHICH IMPROVES FOCUS DETECTION ACCURACY BY USING AN IMAGE SENSOR HAVING A PUPIL DIVISION FUNCTION

(71) Applicant: CANON KABUSHIKI KAISHA, Tokyo (JP)

(72) Inventors: Tomonaga Iwahara, Kanagawa (JP); Daiki Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 17/963,269

(22) Filed: Oct. 11, 2022

(65) Prior Publication Data

US 2023/0122172 A1 Apr. 20, 2023

(30) Foreign Application Priority Data

Oct. 15, 2021 (JP) .................................. 2021-169849

(51) Int. Cl.
*H04N 25/704* (2023.01)
*H04N 25/75* (2023.01)

(52) U.S. Cl.
CPC ........... *H04N 25/704* (2023.01); *H04N 25/75* (2023.01)

(58) Field of Classification Search
CPC ...... H04N 25/704; H04N 25/75; H04N 25/44; H04N 25/07
See application file for complete search history.

(56) References Cited

U.S. PATENT DOCUMENTS

| 8,773,560 | B2* | 7/2014 | Okita ..................... H04N 25/77 348/300 |
| 10,425,605 | B2* | 9/2019 | Tanaka ................... H04N 25/76 |
| 10,911,707 | B2* | 2/2021 | Niwa ................ H01L 27/14621 |
| 11,405,570 | B2* | 8/2022 | Totsuka ............ H01L 27/14634 |
| 2010/0271523 | A1* | 10/2010 | Hara ....................... H04N 25/75 348/E5.091 |
| 2020/0194484 | A1* | 6/2020 | Miura .................. H04N 25/704 |
| 2021/0400221 | A1* | 12/2021 | Lee ........................ H04N 25/75 |
| 2023/0041630 | A1* | 2/2023 | Galor Gluskin ....... H04N 25/44 |

FOREIGN PATENT DOCUMENTS

JP 2013-106194 A 5/2013
JP 2014-157338 A 8/2014

* cited by examiner

*Primary Examiner* — Timothy J Henn
(74) *Attorney, Agent, or Firm* — Cowan, Liebowitz & Latman, P.C.

(57) ABSTRACT

An image capturing apparatus comprises a pixel array in which a plurality of column output lines including a first column output line and a second column output line are arranged for each column; and a readout circuit configured to read out signals from the pixels via the column output lines, wherein the readout circuit performs a first read-out scan of reading out signals via the first column output line from a first pixel group of the pixel array, and a second read-out scan of reading out signals via the second column output line from a second pixel group, and the readout circuit reads out a phase-difference signal of a horizontal direction by the first read-out scan, and reads out a phase-difference signal of a vertical direction by the second read-out scan.

13 Claims, 12 Drawing Sheets

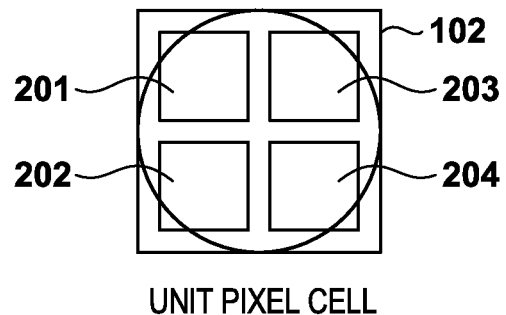
FIG. 2A  UNIT PIXEL CELL
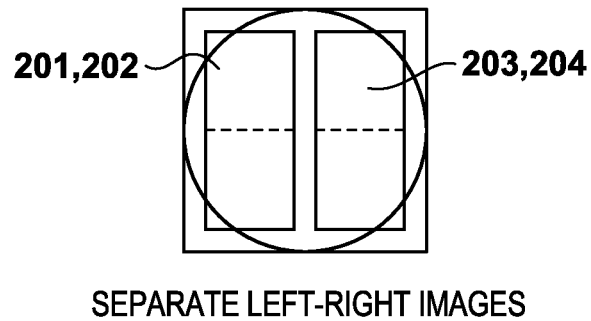
FIG. 2B  SEPARATE LEFT-RIGHT IMAGES
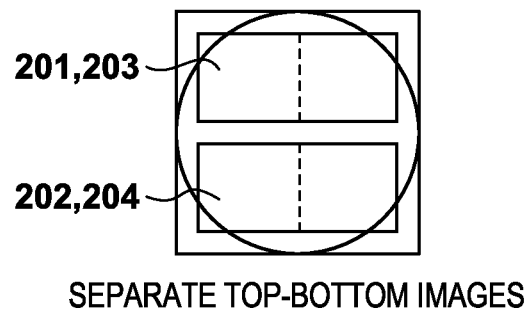
FIG. 2C  SEPARATE TOP-BOTTOM IMAGES
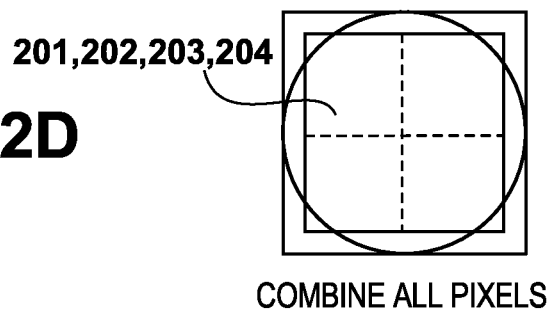
FIG. 2D  COMBINE ALL PIXELS

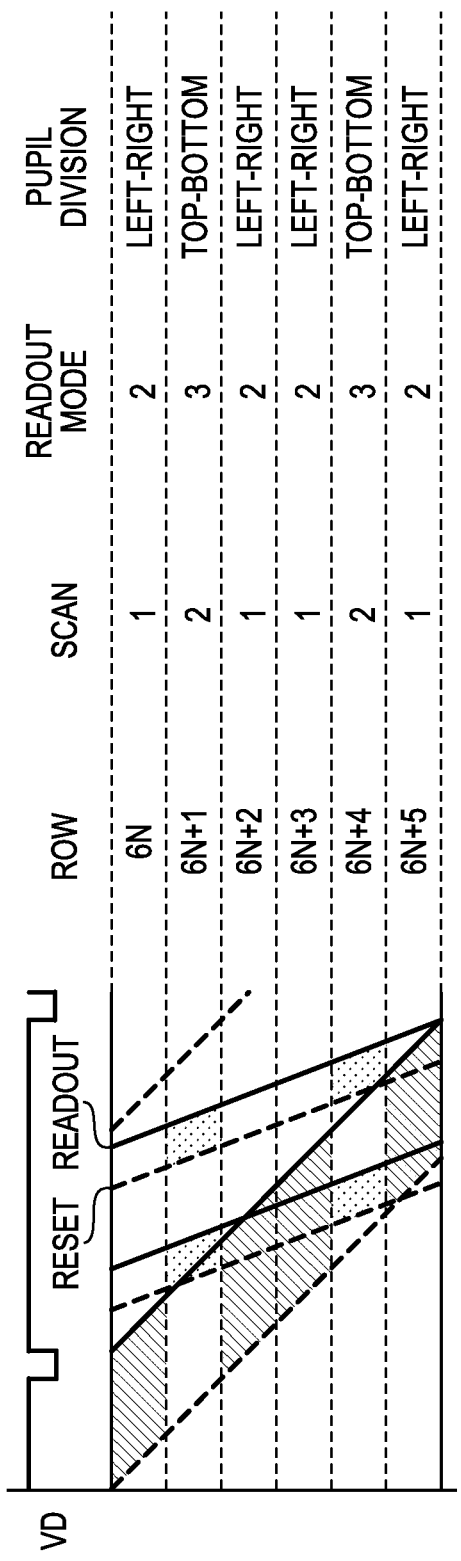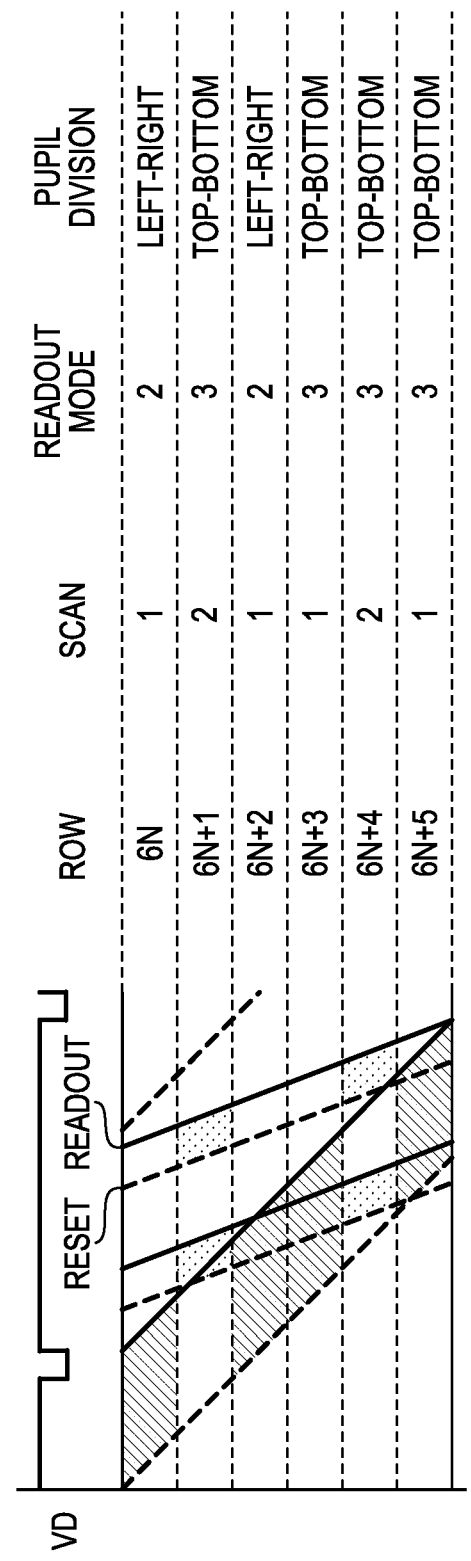

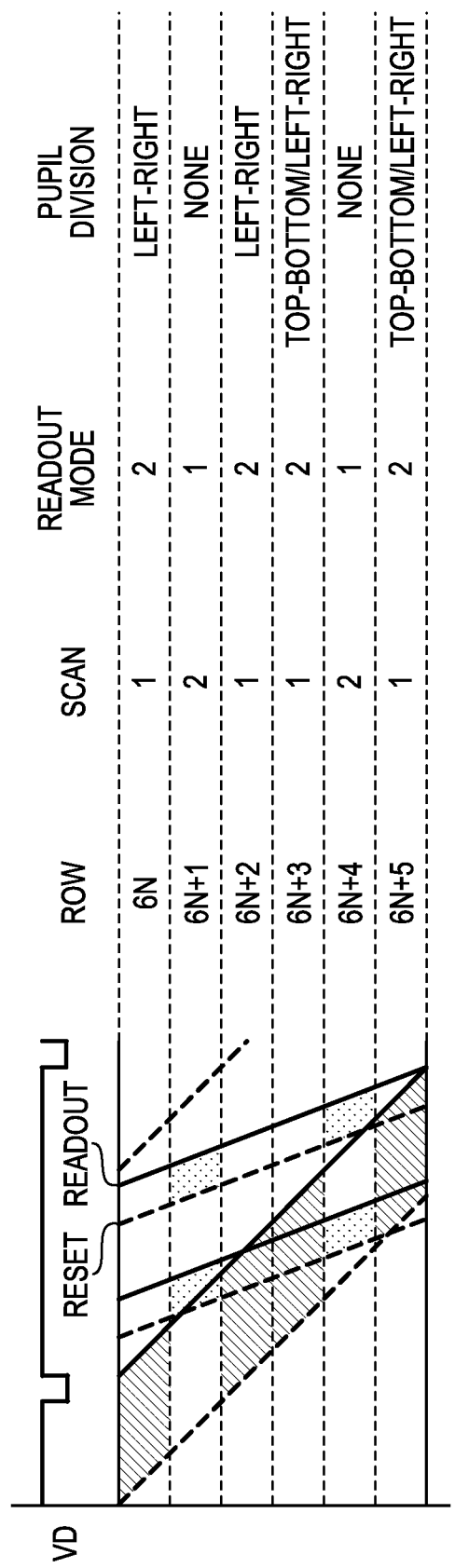

IMAGE CAPTURING APPARATUS WHICH IMPROVES FOCUS DETECTION ACCURACY BY USING AN IMAGE SENSOR HAVING A PUPIL DIVISION FUNCTION

BACKGROUND OF THE INVENTION

Field of the Invention

The present invention relates to an image capturing apparatus and a method of controlling an image capturing apparatus.

Description of the Related Art

An image sensor such as a CMOS image sensor is used in an image capturing apparatus such as a digital camera and a video camera.

There is an image sensor having a pupil division function, and in an image capturing apparatus including such an image sensor, automatic focus adjustment (autofocus) can be performed by detecting a phase difference from a plurality of signals obtained by photoelectrically converting a subject image subjected to pupil division.

Japanese Patent Laid-Open No. 2013-106194 discloses an image capturing apparatus having an image sensor including one micro lens provided with a plurality of photoelectric conversion units. In the image capturing apparatus disclosed in Japanese Patent Laid-Open No. 2013-106194, a phase-difference signal of an A image signal and a B image signal is generated from a subject image subjected to pupil division. A focus difference (defocus amount) can be calculated by performing a correlation operation with respect to the A image signal and the B image signal.

Furthermore, Japanese Patent Laid-Open No. 2014-157338 discloses an image capturing apparatus that performs pupil division not only in a horizontal direction but also in a vertical direction and that detects a phase difference. According to the image capturing apparatus disclosed in Japanese Patent Laid-Open No. 2014-157338, a decrease in focus detection accuracy due to a mismatch between an image separation direction of an image sensor and an image direction (a vertical line or a transverse line) of a subject can be suppressed by switching pupil-divided directions at a predetermined period.

As disclosed in Japanese Patent Laid-Open No. 2014-157338, in a case where the image separation direction of the image sensor and the image direction of the subject do not match, focus detection accuracy decreases.

Furthermore, in conventional technology disclosed in Japanese Patent Laid-Open No. 2014-157338, when pixel signals are read out from a plurality of pixels arranged in the image sensor, the readout of the pixel signals are sequentially performed in a predetermined direction. In a case where a phase-difference signal is acquired by performing pupil division in the horizontal direction (row direction) in a method of sequentially performing readout of pixel signals in the row direction, focus detection for an identical row can be performed in readout time for approximately one row.

On the other hand, in a case where a phase-difference signal is acquired by performing pupil division in the vertical direction (column direction) in a method of sequentially performing readout of pixel signals in the row direction, focus detection for an identical column cannot be performed until all phase-difference signals of the identical column are read out. That is, for the purpose of performing focus detection in the column direction, signals for approximately one frame are required to be read out, and it takes time equivalent to readout time for one frame. Due to this, time that focus adjustment takes differs depending on a scan direction of signal readout and a pupil-divided direction of the image sensor.

Furthermore, a difference ascribable to a pupil-divided direction and a signal readout direction in time that it takes to enable focus detection affects focus detection performance more in a case where a subject is a moving body.

That is, in a case where pupil division is performed in the horizontal direction (row direction), readout is completed by taking time for approximately one row (several to several tens of microseconds), and thus, even when a subject is a moving body, a subject position shift is small. However, in a case where pupil division is performed in the vertical direction (column direction), readout takes readout time for approximately one frame (several to several tens of milliseconds), and thus, a subject position shift becomes relatively large, and focus detection performance decreases.

SUMMARY OF THE INVENTION

The present invention has been made in view of the problems described above, and provides an image capturing apparatus that can improve focus detection accuracy in a case where focus detection is performed by using an image sensor having a pupil division function.

According to a first aspect of the present invention, there is provided an image capturing apparatus comprising: a pixel array in which pixels are arranged in a matrix and in which a plurality of column output lines including a first column output line and a second column output line are arranged for each column of the pixels of a plurality of pixel columns; and a readout circuit configured to read out signals from the pixels via the column output lines, wherein the readout circuit performs a first read-out scan of reading out signals via the first column output line from a first pixel group of the pixel array, and a second read-out scan of reading out signals via the second column output line from a second pixel group different from the first pixel group of the pixel array, and the readout circuit reads out a phase-difference signal of a horizontal direction by the first read-out scan, and reads out a phase-difference signal of a vertical direction by the second read-out scan.

According to a second aspect of the present invention, there is provided an image capturing apparatus comprising: a pixel array in which pixels are arranged in a matrix and in which a plurality of column output lines including a first column output line and a second column output line are arranged for each column of the pixels of a plurality of pixel columns; and a readout circuit configured to read out signals from the pixels via the column output lines, wherein the readout circuit performs a first read-out scan of reading out signals via the first column output line from a first pixel group of the pixel array, and a second read-out scan of reading out signals via the second column output line from a second pixel group different from the first pixel group of the pixel array, and the readout circuit reads out an image signal by the first read-out scan, and reads out a phase-difference signal by the second read-out scan.

According to a third aspect of the present invention, there is provided an image capturing apparatus comprising: a pixel array in which pixels are arranged in a matrix and in which a plurality of column output lines including a first column output line and a second column output line are arranged for each column of the pixels of a plurality of pixel columns; and a readout circuit configured to read out signals from the pixels via the column output lines, wherein the readout circuit performs a first read-out scan of reading out signals via the first column output line from a first pixel group of the pixel array, and a second read-out scan of reading out signals via the second column output line from a second pixel group different from the first pixel group of the pixel array, and the readout circuit reads out a phase-difference signal by the first read-out scan, and reads out a photometric signal by the second read-out scan.

Further features of the present invention will become apparent from the following description of exemplary embodiments with reference to the attached drawings.

BRIEF DESCRIPTION OF THE DRAWINGS

FIGS. 2A to 2D are configuration diagrams of pixels in an image sensor.

FIG. 9 is a conceptual view illustrating a vertical scan and a pupil-divided direction in a first embodiment.

FIG. 10 is a conceptual view illustrating a vertical scan and a pupil-divided direction in a second embodiment.

FIG. 13 is a conceptual view illustrating a vertical scan and a pupil-divided direction in the fourth embodiment.

DESCRIPTION OF THE EMBODIMENTS

Figure 1:
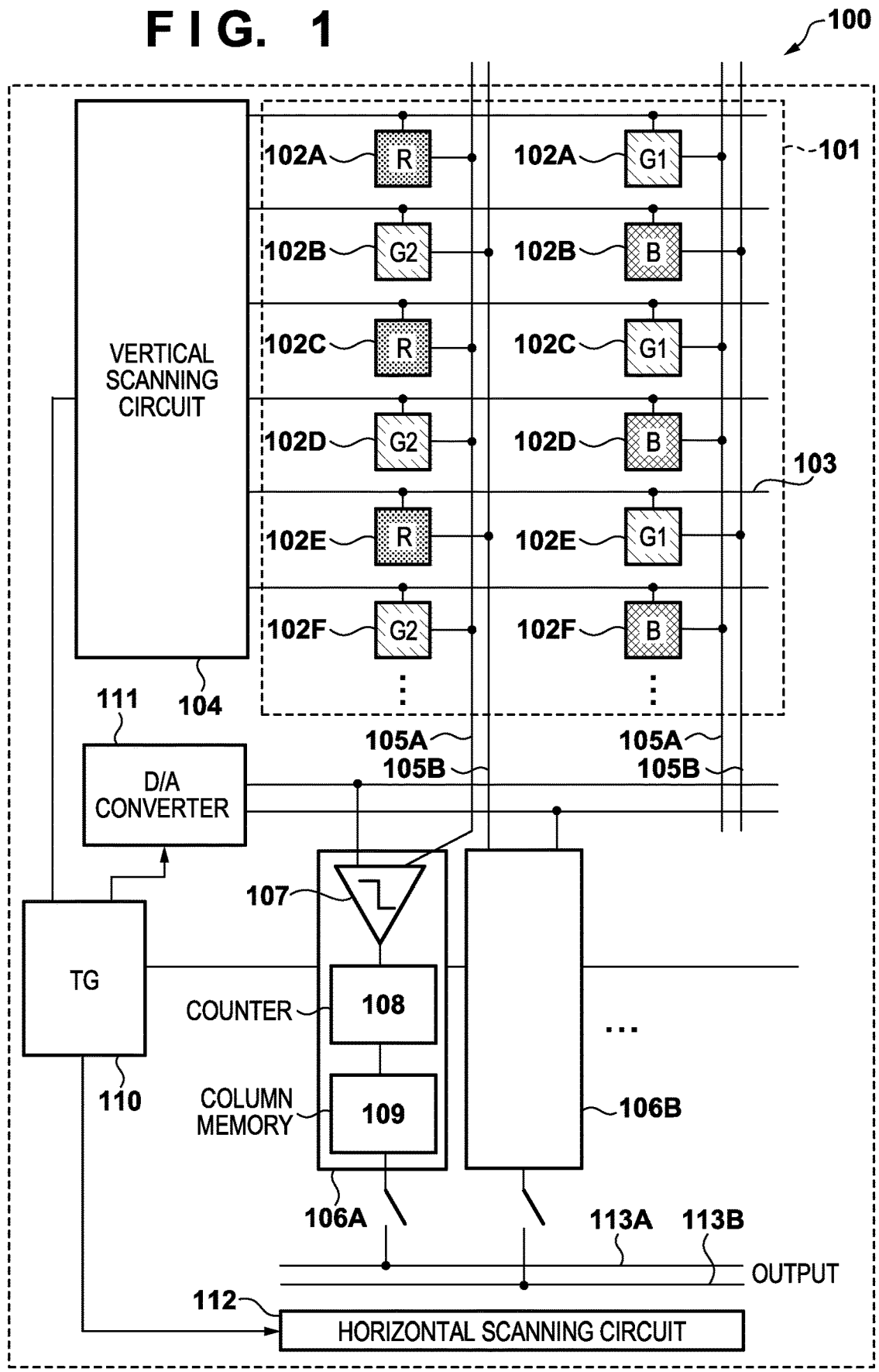
FIG. 1 is a configuration diagram of a pixel and a peripheral circuit of an image sensor.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration example of a pixel and a peripheral circuit of an image sensor 100 related to a first embodiment of the present invention.

In FIG. 1, in a pixel section (pixel array) 101, pixels 102 are arranged in a matrix, and a so-called Bayer array in which a color filter is formed in each of the pixels 102 is constituted. The present embodiment will be explained, assuming that two column output lines are arranged for each column of pixel columns of the pixel array. However, the number of the column output lines is not limited to this, and any number of the column output lines such as 4, 12, or 20 column output lines can be arranged in accordance with demanded performance.

A pixel 102A is connected to a column output line 105A by a selection switch not illustrated, and outputs a pixel signal to a column circuit 106A for each row. In the present embodiment, in addition, pixels 102C, 102D, and 102F are connected to the column output line 105A.

A pixel 102B is connected to a column output line 105B by a selection switch not illustrated, and outputs a pixel signal to a column circuit 106B for each row. In the present embodiment, in addition, a pixel 102E is connected to the column output line 105B.

Here, each of the pixels may be provided with a plurality of selection switches, and each of the pixels may be configured to be connected to both the column output lines 105A and 105B.

The selection switches are each a switch that performs selection control of a particular row of pixels via a signal line 103 from a vertical scanning circuit 104, and are scanned in a row direction by the vertical scanning circuit 104.

A timing generator (TG, below) 110 generates a pulse signal of controlling the vertical scanning circuit 104 and of controlling a transistor and the like arranged within each of the pixels 102, and generates a comparison reference signal. Furthermore, a D/A converter (DAC, below) 111 generates a reference signal (a slope signal or a ramp signal) that changes in a level over time. The reference signal is input as one signal of a comparator 107 by control of the TG 110.

As a column circuit 106, column circuits 106A and 106B corresponding to the column output lines 105A and 105B, respectively are arranged.

The column circuit 106 is configured with the comparator 107, a counter 108, and a column memory 109.

The reference signal generated by the DAC 111 is input to one input of the comparator 107, and a column output line 105 is connected to the other input of the comparator 107. The comparator 107 compares a potential V of the column output line 105 with the reference signal that changes over time, and detects time taken until magnitude relationship between the potential V and the reference signal is inverted.

The counter 108 measures the above-described time taken until the magnitude relationship is inverted, based upon a clock, and generates a digital signal, based upon the time measured. The column memory 109 holds the digital signal generated based on the time measured by the counter 108.

A horizontal scanning circuit 112 scans the column circuit in the row direction, and outputs the digital signal held in the column memory 109, through horizontal signal lines 113A and 113B commonly connected for each column. The horizontal scanning circuit 112 is also controlled by the TG 110.

FIGS. 2A to 2D are figures each illustrating a configuration of the pixels 102. In FIG. 2A, a unit pixel 102 has subpixels 201, 202, 203, and 204 each including a photoelectric conversion unit, and these four subpixels share one micro lens.

As illustrated in FIG. 2B, pupil division in a left-right direction (row direction) is performed to obtain a signal by separating and reading out a composition signal of the subpixels 201 and 202 among the four subpixels and a composition signal of the subpixels 203 and 204 among the four subpixels. Furthermore, as illustrated in FIG. 2C, pupil division in a top-bottom direction (column direction) is performed to obtain a signal by separating and reading out a composition signal of the subpixels 201 and 203 and a composition signal of the subpixels 202 and 204. Then, as illustrated in FIG. 2D, an image signal is obtained by combining signals of the four subpixels.

The signal obtained by performing the pupil division in the left-right direction (row direction) is suitable for detection of a subject mainly including a vertical line, and this division direction may be referred to as a short grain. The signal obtained by performing the pupil division in the top-bottom direction (column direction) is suitable for detection of a subject mainly including a transverse line, and this division direction may be referred to as a long grain.

Signals based upon photoelectric conversion of the subpixels 201, 202, 203, and 204 will be referred to below as an A signal, a B signal, a C signal, and a D signal, respectively. Furthermore, for instance, a composition signal of the subpixels 201 and 202 will be referred to as an A+B signal.

Figure 3:
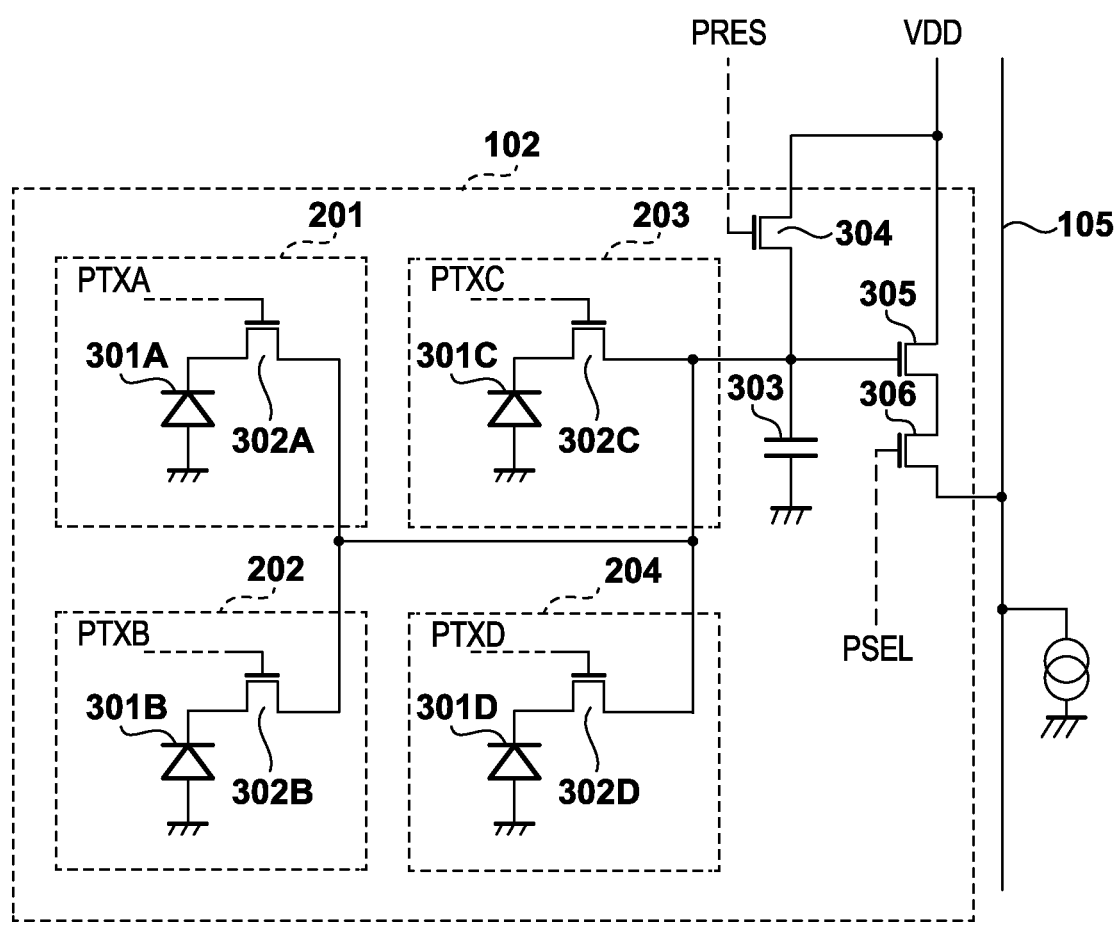
FIG. 3 is a circuit diagram of a pixel in an image sensor.

FIG. 3 is a circuit diagram illustrating an example of a configuration of the pixel 102. A photodiode (PD, below) 301A that is a photoelectric conversion unit included in the subpixel 201 is connected to a common floating diffusion (FD, below) 303 via a transfer switch 302A. Here, the transfer switch 302A is controlled by a transfer pulse PTXA output from the vertical scanning circuit 104.

The same applies to the subpixels 202, 203, and 204, and PDs 301B, 301C, and 301D of the subpixels 202, 203, and 204 are connected to the common FD 303 via transfer switches 302B, 302C, and 302D, respectively. The transfer switches 302B, 302C, and 302D of the subpixels 202, 203, and 204 are controlled by transfer pulses PTXB, PTXC, and PTXD, respectively.

The FD 303 temporarily accumulates electric charge transferred from the PDs 301A to 301D and converts the electric charge into voltage. A reset switch 304 is controlled by a reset pulse PRES and supplies a reference potential VDD to the FD 303.

A pixel amplifier 305 is a source follower circuit composed of a MOS transistor and a constant current source. A selection switch 306 is controlled by a selection pulse PSEL and outputs potential variation of the pixel amplifier 305 from the column output line 105 to the column circuit 106.

Figure 4:
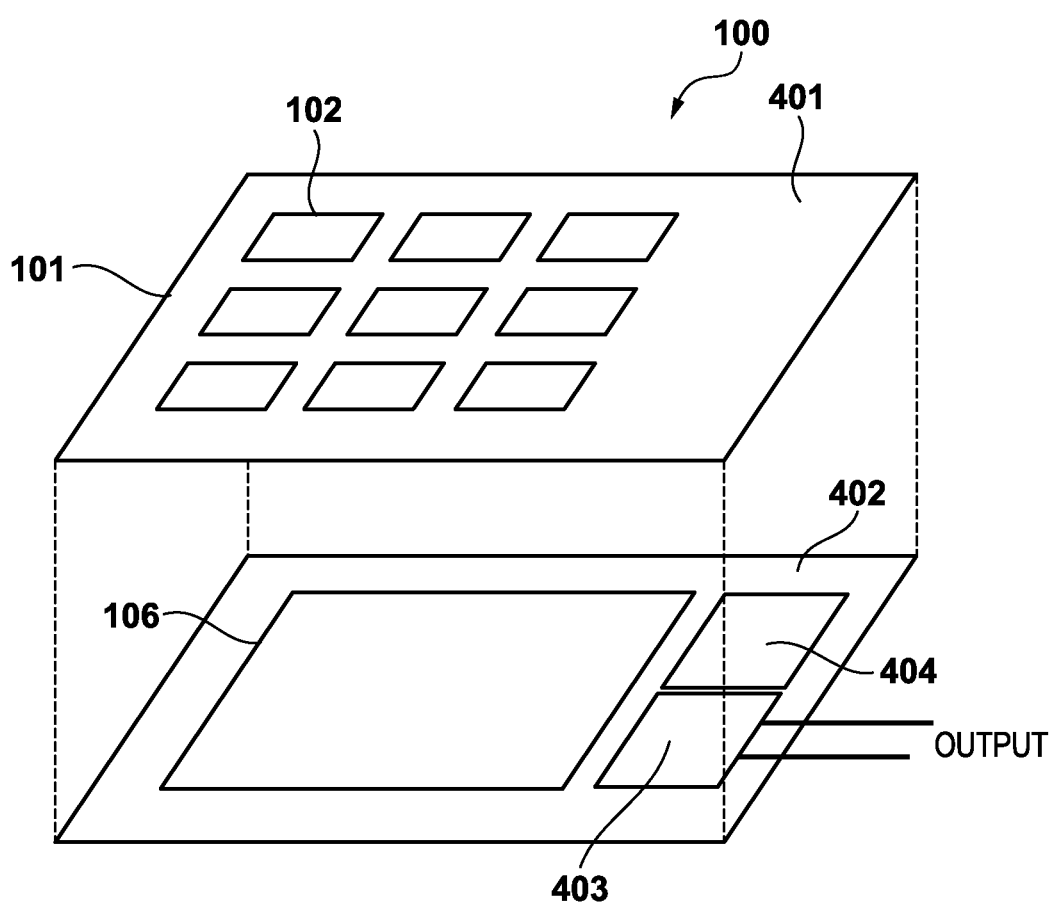
FIG. 4 is a schematic diagram illustrating a stacked structure of an image sensor.

FIG. 4 is a schematic diagram illustrating a structure of an image sensor 100 of the present embodiment. The image sensor 100 is constituted by stacking a first substrate 401 in which a pixel section 101 and the like are formed, and a second substrate 402 in which a readout circuit such as the column circuit 106 is formed.

The second substrate 402 is configured with the column circuit 106, a digital front end 403, and a substrate memory 404. The column circuit 106 is electrically connected to the first substrate 401 by a bump or the like. The digital front end 403 performs various types of arithmetic operation processing and correction processing. The substrate memory 404 is a volatile memory such as a DRAM, and is used, for instance, for the purpose of temporally holding data when a signal from the column circuit 106 is processed by the digital front end 403.

Figure 5:
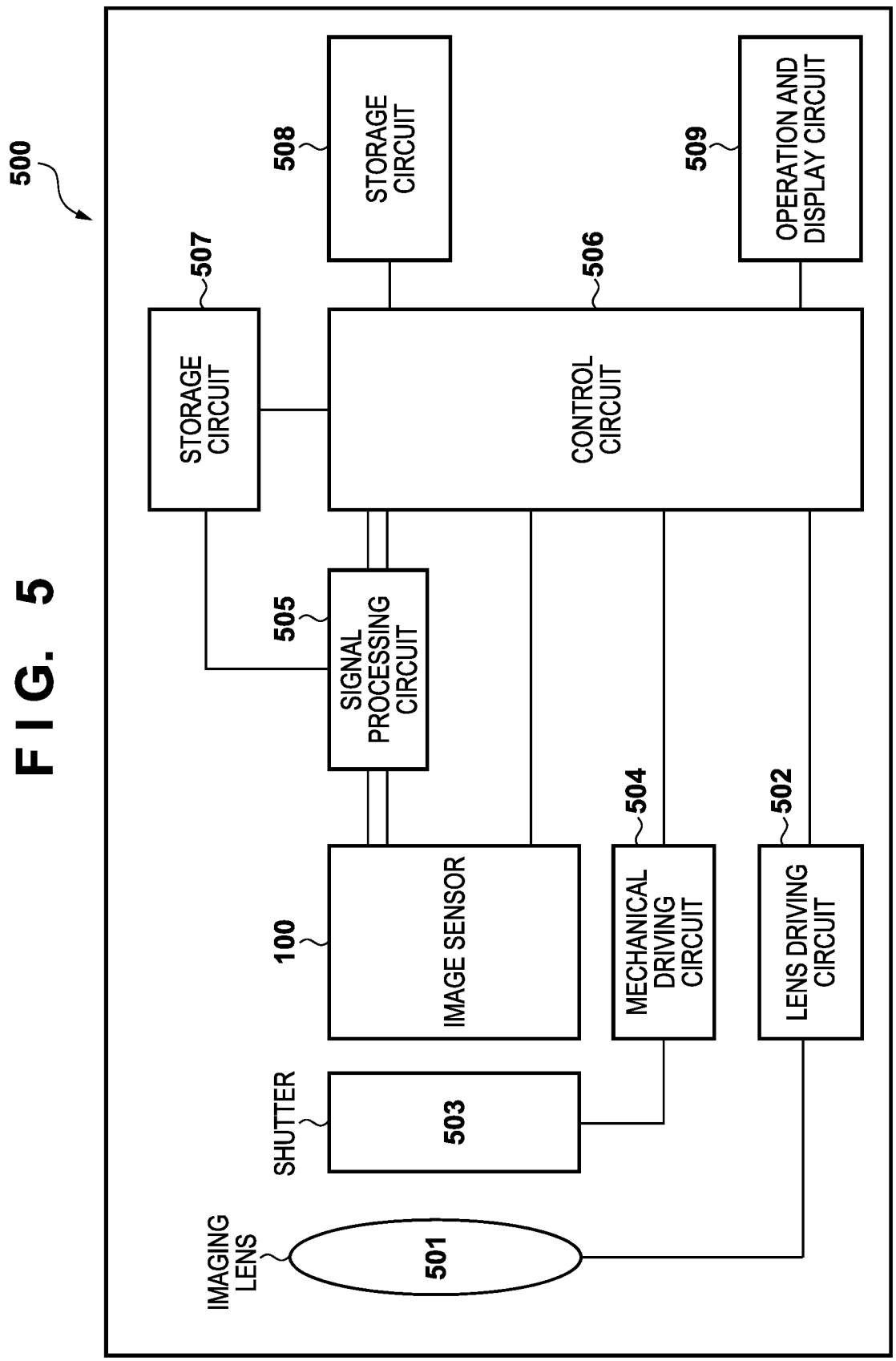
FIG. 5 is a block diagram illustrating a configuration example of an image capturing apparatus.

FIG. 5 is a block diagram illustrating a configuration of an image capturing apparatus 500 of the present embodiment.

The image sensor 100 converts incident light into an electrical signal and outputs the electrical signal. Focus control or the like of an imaging lens 501 is performed by a lens driving circuit 502, and the imaging lens 501 forms an optical image of a subject on the image sensor 100.

A shutter 503 that controls an exposure amount (dose) is controlled by a mechanical driving circuit 504. A signal processing circuit 505 performs various types of arithmetic operation processing such as gain processing, offset correction processing, and white balance correction processing with respect to an image signal.

The image sensor 100 and the signal processing circuit 505 are connected by a plurality of signal lines. The image capturing apparatus 500 of the present embodiment is configured such that signals output from the horizontal signal lines 113A and 113B of the image sensor 100 are independently input to the signal processing circuit 505.

A control circuit 506 controls the image capturing apparatus 500 entirely, while performing various types of processing such as driving control of the image sensor 100, an autofocus operation, and shutter control. The signal processing circuit 505 may be incorporated in the control circuit 506.

A storage circuit 507 is a storage memory that holds image data and an offset correction value. The storage circuit 507 is also connected to the signal processing circuit 505. Further, the storage circuit 507 may also be connected to the digital front end 403 of the image sensor 100, and may be configured to be able to selectively perform communication of data and a correction value.

A storage circuit 508 that is removable such as a semiconductor memory stores image data. An operation and display circuit 509 receives a user operation and also displays various types of information.

Figure 6:
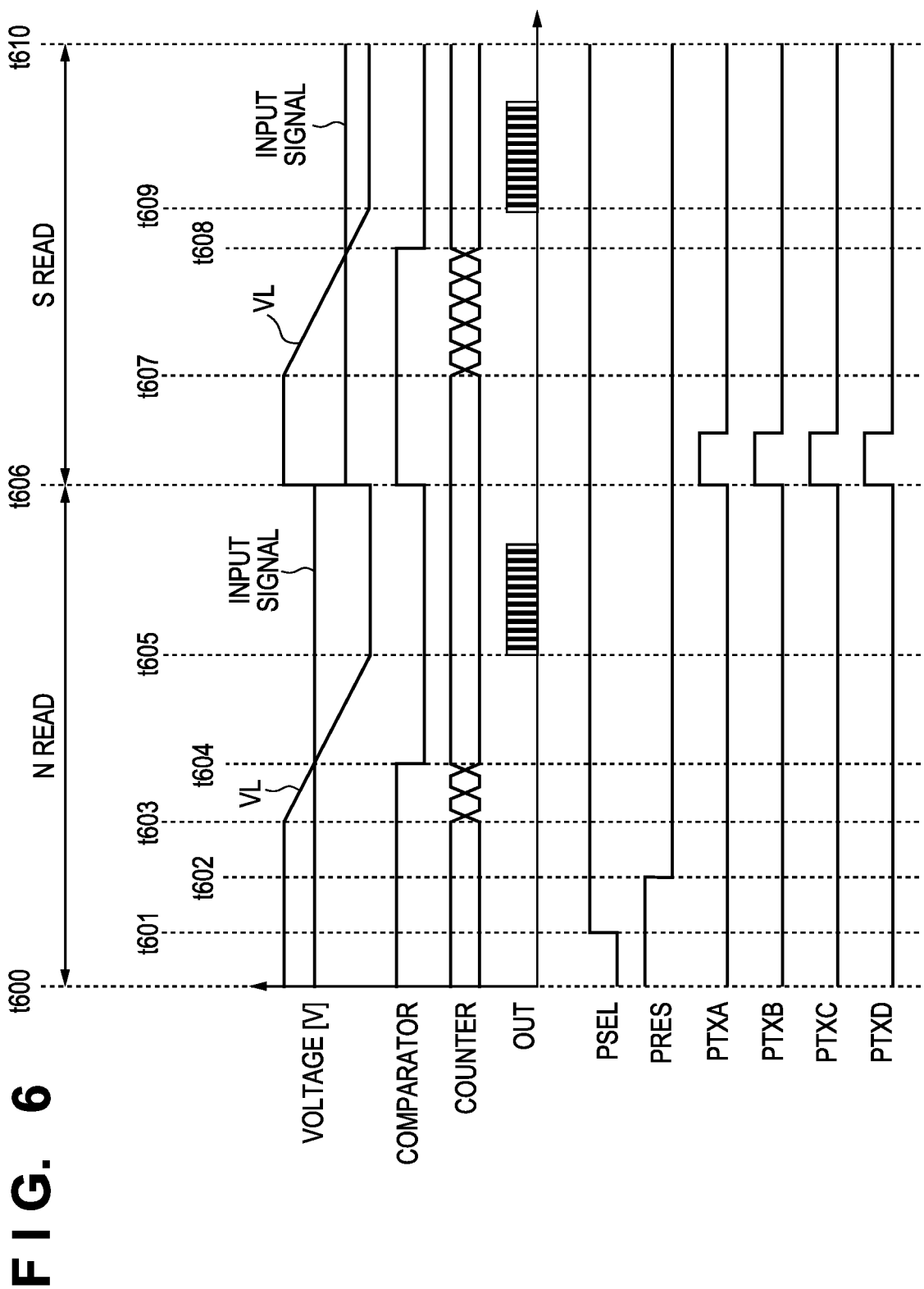
FIG. 6 is a timing chart illustrating a first readout operation.

FIG. 6 is a timing chart illustrating a first readout mode in the present embodiment. FIG. 6 illustrates the case where only an image signal is read out.

It is assumed that at a time point until time t600, the pixel section 101 is reset and electric charge accumulation starts. Here, in the reset, the reset pulse PRES is set to Hi and the transfer pulse PTX is set to Hi, and during the electric charge accumulation, the reset pulse PRES is set to Hi and the transfer pulse PTX is set to Lo.

At time t601, the unit pixel 102 of a certain row is connected to the column output line 105 by the selection pulse PSEL.

At time t602, the reset pulse PRES is changed from Hi to Lo, and thus, the potential V (N signal) of the FD 303 obtained after reset-release is input to the comparator 107 via the column output line 105.

At time t603, the DAC 111 starts an output of a reference signal VL that changes in a ramp form. Concurrently with the output of the reference signal VL by the DAC 111, count by the counter 108 starts.

At time t604, magnitude relationship between an input signal and the reference signal VL is inverted, and thus, an output of the comparator 107 is inverted, and a count value of the counter 108 at that time is held in the column memory 109. Subsequently, after the reference signal VL transits to reach a predetermined upper limit at time t605, a signal is output by the horizontal scanning circuit 112, and thus, readout of the signal (N signal) obtained after the reset-release of the pixel 102 ends.

At time t606, electric charge of the four subpixels 201 to 204 is transferred to the FD 303 by the transfer pulses PTXA, PTXB, PTXC, and PTXD, respectively, and the potential V of the column output line 105 becomes a potential according to a pixel signal (A+B+C+D signal). Furthermore, reset of the comparator 107 is performed.

At time t607, the DAC 111 starts an output of the reference signal VL that changes in a ramp form. Concurrently with the output of the reference signal VL by the DAC 111, count by the counter 108 starts.

At time t608, magnitude relationship between an input signal and the reference signal VL is inverted, and thus, an output of the comparator 107 is inverted, and a count value of the counter 108 at that time is held in the column memory 109. Subsequently, after the reference signal VL transits to reach a predetermined upper limit at time t609, a signal is output by the horizontal scanning circuit 112, and thus, readout of the pixel signal (A+B+C+D signal) of the pixel 102 ends.

Subsequently, predetermined signal processing such as subtraction of the N signal from the A+B+C+D signal is performed.

A sequence of the operations described above is independently performed by the column output lines 105A and 105B, the column circuits 106A and 106B, and the horizontal signal lines 113A and 113B.

Figure 7:
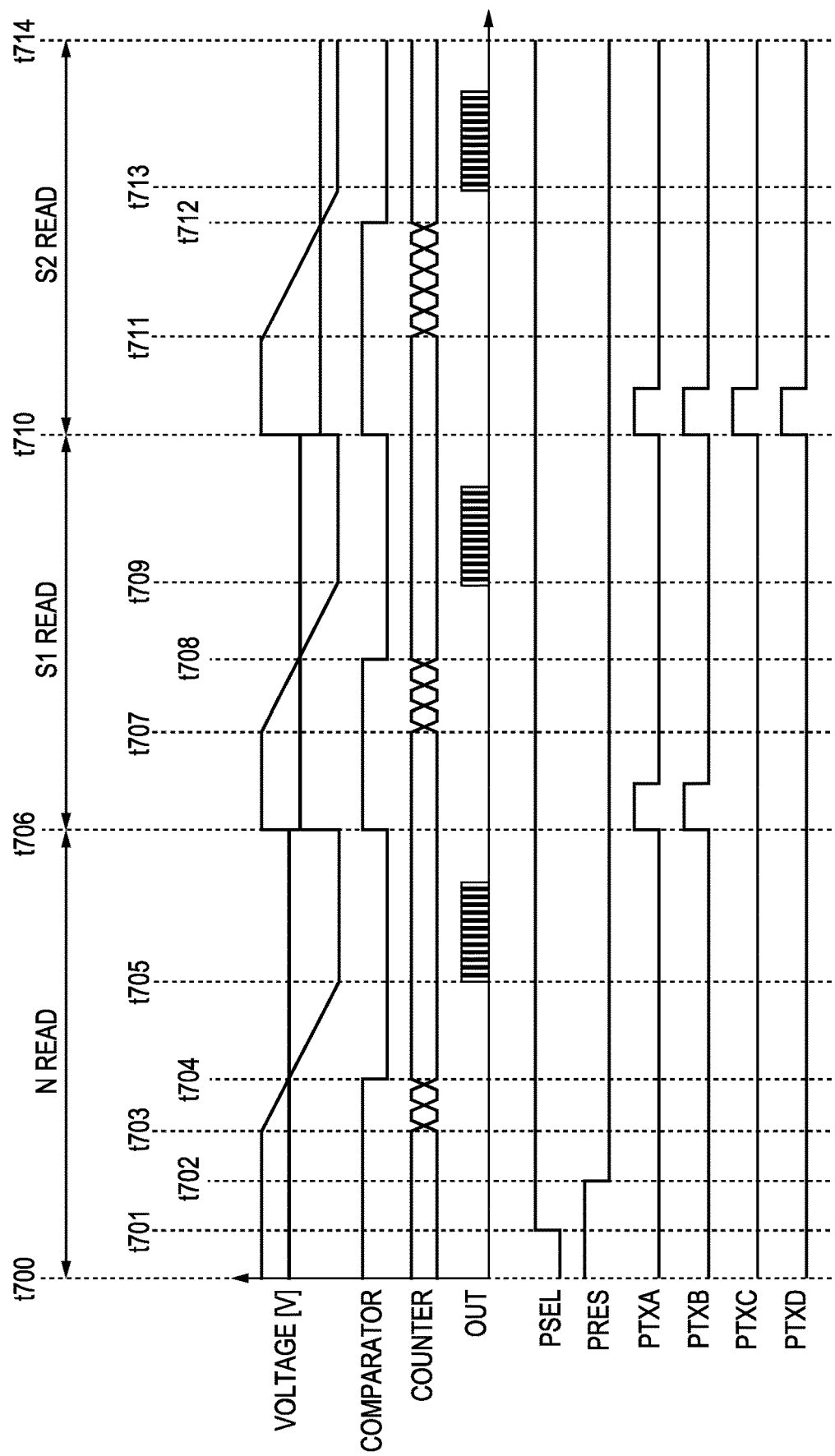
FIG. 7 is a timing chart illustrating a second readout operation.

FIG. 7 is a timing chart illustrating a second readout mode in the present embodiment. FIG. 7 illustrates the case where both an image signal and a phase-difference signal of the left-right direction (horizontal direction) are read out.

Processing until end of readout of the signal (N signal) obtained after reset-release at time t705 is the same as that in FIG. 6, and thus, explanation of the processing will be omitted.

At time t706, electric charge of the subpixels 201 and 202 is transferred to the FD 303 by the transfer pulses PTXA and PTXB, respectively, and the potential V of the column output line 105 becomes a potential according to a pixel signal (A+B signal). Furthermore, reset of the comparator 107 is performed.

At time t707, the DAC 111 starts an output of the reference signal VL that changes in a ramp form. Concurrently with the output of the reference signal VL by the DAC 111, count by the counter 108 starts.

At time t708, magnitude relationship between an input signal and the reference signal VL is inverted, and thus, an output of the comparator 107 is inverted, and a count value of the counter 108 at that time is held in the column memory 109. Subsequently, after the reference signal VL transit to reach a predetermined upper limit at time t709, a signal is output by the horizontal scanning circuit 112. Due to this, readout of the pixel signal (A+B signal) of the pixel 102 ends.

At time t710, electric charge of the four subpixels 201 to 204 is transferred to the FD 303 by the transfer pulses PTXA, PTXB, PTXC, and PTXD, respectively, and the potential V of the column output line 105 becomes a potential according to a pixel signal (A+B+C+D signal). Furthermore, reset of the comparator 107 is performed.

At time t711, the DAC 111 starts an output of the reference signal VL that changes in a ramp form. Concurrently with the output of the reference signal VL by the DAC 111, count of the counter 108 starts.

At time t712, magnitude relationship between an input signal and the reference signal VL is inverted, and thus, an output of the comparator 107 is inverted, and a count value of the counter 108 at that time is held in the column memory 109. Subsequently, after the reference signal VL transits to reach a predetermined upper limit at time t713, a signal is output by the horizontal scanning circuit 112. Due to this, readout of the pixel signal (A+B+C+D signal) of the pixel 102 ends.

Subsequently, predetermined signal processing such as subtraction of the N signal from the A+B signal and the A+B+C+D signal is performed. Furthermore, a C+D signal is obtained by subtracting the A+B signal from the A+B+C+D signal. An image signal is constituted by the A+B+C+D signal, and a phase-difference signal is constituted by the A+B signal and the C+D signal.

Figure 8:
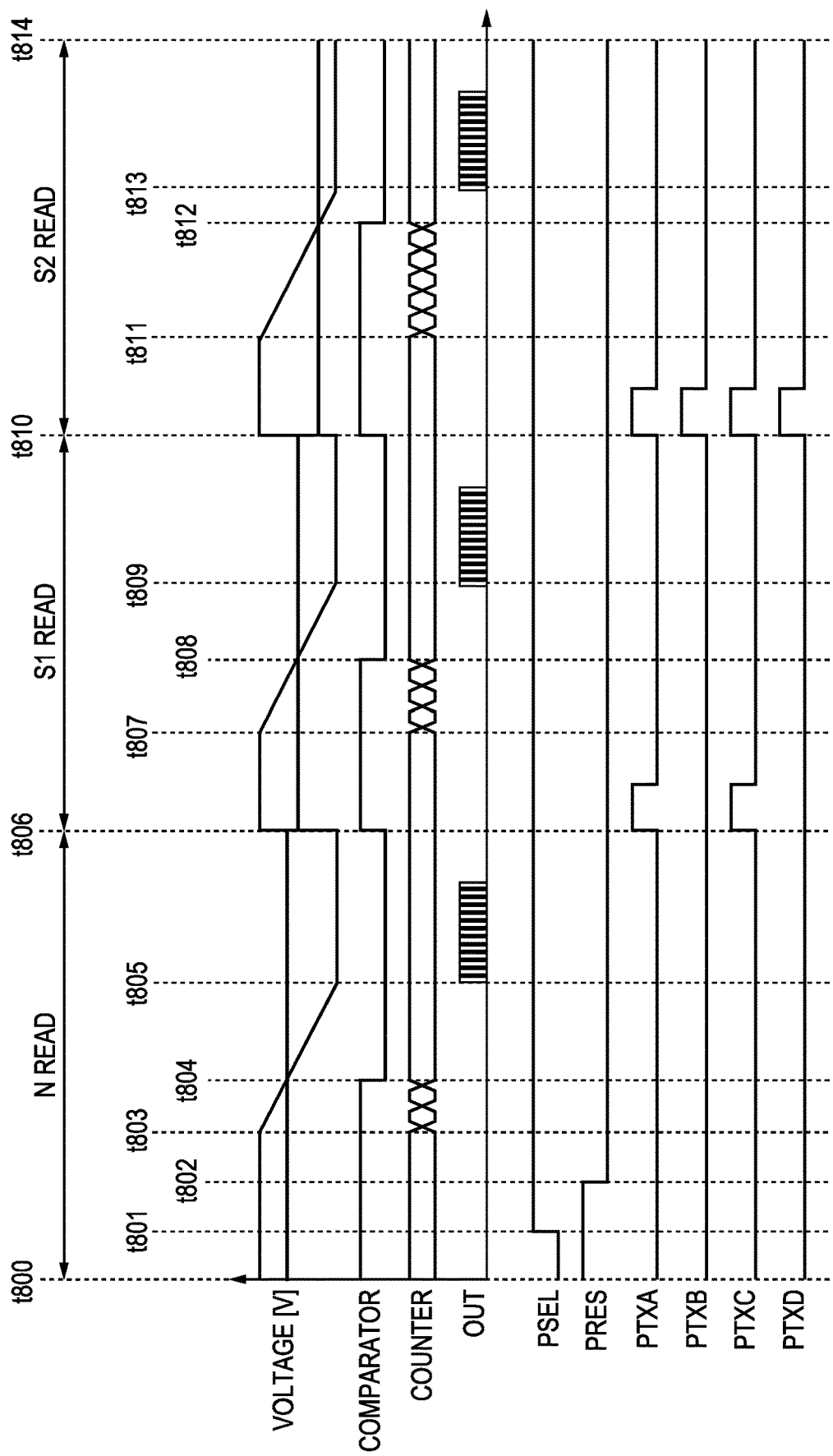
FIG. 8 is a timing chart illustrating a third readout operation.

FIG. 8 is a timing chart illustrating a third readout mode in the present embodiment. FIG. 8 illustrates the case where both an image signal and a phase-difference signal of the top-bottom direction (vertical direction) are read out.

To avoid redundancy, explanation of the same processing as that in FIG. 7 will be omitted. A difference from FIG. 7 is that electric charge transfer at time t806 is performed by the transfer pulses PTXA and PTXC. Due to this, electric charge of the subpixels 201 and 203 is transferred to the FD 303, and a pixel signal (A+C signal) of the pixel 102 is read out.

A B+D signal is obtained by subtracting the A+C signal from the A+B+C+D signal. An image signal is constituted by the A+B+C+D signal, and a phase-difference signal is constituted by the A+C signal and the B+D signal.

The image signal acquired in this way is used for live view display and the like, and the phase-difference signal acquired in this way is used for focus detection and the like. Note that in a case where both the signals are read out, use of both the signals or use of only one of the signals can be selected as appropriate in accordance with an operation mode of the image capturing apparatus.

FIG. 9 is a conceptual view explaining relationship between a read-out scan and a pupil-divided direction in a readout operation of a pixel signal in the present embodiment. In FIG. 9, six rows of pixels are illustrated as an example, and the case where a read-out scan is sequentially performed in units of row is illustrated.

In FIG. 9, row numbers 6N, 6N+2, 6N+3, and 6N+5 each indicate a row for obtaining a phase-difference signal by performing pupil division in the left-right direction, and these are expressed as a first pixel group. Row numbers 6N+1 and 6N+4 each indicate a row for obtaining a phase-difference signal by performing pupil division in the top-bottom direction, and these are expressed as a second pixel group.

In the present embodiment, signals of the first pixel group are read out via the column output line 105A in the second readout mode, and this is expressed as scan 1. Equally, signals of the second pixel group are read out via the column output line 105B in the third readout mode, and this is expressed as scan 2.

A left figure of FIG. 9 illustrates a so-called slit rolling operation in which image capturing timing is predefined by a vertical synchronization signal (VD). A vertical axis of the figure indicates a row number, and a horizontal axis indicates time. A solid line represents a signal readout timing of a target row, a broken line represents timing of reset (start of accumulation of an electronic shutter) of a target row, and a hatched portion corresponds to exposure time of a target row.

Signal readout in scan 1 starts from the vertical synchronization signal VD. Reset (start of accumulation) in scan 1 starts with a preceding frame. After the start of the signal readout in scan 1, signal readout in scan 2 independently starts within predetermined time. Reset (start of accumulation) in scan 2 can be set at timing and accumulation time that are different from those in scan 1. For instance, in a 6N+3 row for scan 1 and a 6N+4 row for scan 2, accumulation is performed for different length in an equal time slot, and signal readout is performed in parallel by different systems in an equal time slot. Furthermore, in scan 1, signal readout is performed once for one VD, whereas in scan 2, signal readout can be performed a plurality of times for one VD.

In scan 1, thinning readout of the four rows among the six rows is performed for the purpose of live view image capturing and of focus detection in the left-right direction of the image capturing apparatus 100. On the other hand, in scan 2, thinning readout of the two rows among the six rows is performed with emphasis on a frame rate, for the purpose of focus detection in the top-bottom direction.

As described above, in the present embodiment, scan 1 is performed with pupil division in the left-right direction, and scan 2 is performed with pupil division in the top-bottom direction, and thus, focus detection can be performed with both the scans. In scan 2, pixel signals of rows skipped in scan 1 are read out, and the number of signal readout rows is less than that in scan 1, and thus, a phase-difference signal can be acquired at a high speed.

In other words, in scan 1, signals of the first pixel group are read out at a first frame rate. Then, in scan 2, signals of the second pixel group are read out at a second frame rate that is faster than the first frame rate. Thus, in scan 2, readout time can be reduced more than the case where a phase-difference signal of the top-bottom direction is read out in scan 1 (in this example, the read time is reduced about one third), and a decrease in focus detection accuracy due to a subject moving at a high speed can be suppressed.

An image signal and a phase-difference signal read out in each of scan 1 and scan 2 are subjected to predetermined processing such as correction processing and a correlation operation by the signal processing circuit 505 and the control circuit 506. Then, the image signal and the phase-difference signal are used for live view display by the operation and display circuit 509 and used for a focus adjustment operation of the imaging lens 501 via the lens driving circuit 502. The focus adjustment of the imaging lens 501 is performed by the control circuit 506 by using the phase-difference signal read out in scan 1 or scan 2.

Due to the fact that scans are selectively used in this way for each selected row in accordance with a pupil-divided direction for autofocus, even in a case where pupil division is performed in the vertical direction and even in a case where a subject is moving, a subject position shift can be suppressed, and accuracy of focus detection can be improved.

Second Embodiment

FIG. 10 is a conceptual view explaining relationship between a read-out scan and a pupil-divided direction in a readout operation of a pixel signal in a second embodiment. In FIG. 10, six rows of pixels are illustrated as an example, and the case where a read-out scan is sequentially performed in units of row is illustrated.

In FIG. 10, row numbers 6N and 6N+2 each indicate a row for obtaining a phase-difference signal by performing pupil division in the left-right direction, and row numbers 6N+3 and 6N+5 each indicate a row for obtaining a phase-difference signal by performing pupil division in the top-bottom direction. These are expressed as a first pixel group. Row numbers 6N+1 and 6N+4 each indicate a row for obtaining a phase-difference signal by performing pupil division in the top-bottom direction, and these are expressed as a second pixel group.

In the second embodiment, signals of the 6N and 6N+2 rows among the first pixel group are read out via a column output line 105A in a second readout mode, and signals of the 6N+3 and 6N+5 rows among the first pixel group are read out via the column output line 105A in a third readout mode. This is expressed as scan 1. Equally, signals of the second pixel group are read out via a column output line 105B in the third readout mode, and this is expressed as scan 2.

Note that a left figure of FIG. 10 is the same as that in FIG. 9, and thus, explanation of processing in the left figure of FIG. 10 will be omitted.

In scan 1, thinning readout of the four rows among the six rows is performed for the purpose of live view image capturing and of focus detection in the left-right direction and the top-bottom direction of an image capturing apparatus. On the other hand, in scan 2, thinning readout of the two rows among the six rows is performed with emphasis on a frame rate, for the purpose of focus detection in the top-bottom direction.

As described above, in the second embodiment, scan 1 is performed with pupil division in the left-right direction and pupil division in the top-bottom direction, and scan 2 is performed with pupil division in the top-bottom direction, and thus, focus detection can be performed with both the scans.

In scan 1, phase-difference signals of both the left-right direction and the top-bottom direction are read out, and thus, a decrease in focus detection accuracy due to an image direction of a subject can be suppressed. Furthermore, in scan 2, pixel signals of rows skipped in scan 1 are read out, and the number of signal readout rows is less than that in scan 1, and thus, a phase-difference signal can be acquired at a high speed. Thus, in scan 2, a decrease in focus detection accuracy due to a subject moving at a high speed can be suppressed.

Phase-difference signals obtained in scan 1 and scan 2, respectively are selectively used in accordance with characteristics of a subject. For instance, resolution in scan 1 is higher than that in scan 2, and thus, focus detection can be performed with high accuracy with respect to a still object. On the other hand, by taking advantage of a high speed of scan 2, scan 2 is suitable for enhancing a frequency of focus detection (the number of times of operations) and for detection of a moving body.

In scan 1 and scan 2, a correlation operation of an equal subject may be performed in an equal region within an angle of view, or a correlation operation of a different subject may be performed in a different region.

Furthermore, in scan 2, readout may also be performed with pupil division in the left-right direction. In this case, phase-difference signals of both the left-right direction and the top-bottom direction are read out in both scan 1 and scan 2, and focus detection in the left-right direction can be performed at a higher speed than with scan 1.

The phase-difference signals of the left-right direction or the top-bottom direction read out in scan 1 and scan 2, respectively may be combined by a signal processing circuit 505 or a control circuit 506 to be one phase-difference signal.

For instance, in the 6N+3 row for scan 1 and the 6N+4 row for scan 2 of FIG. 10, accumulation is performed at substantially equal time, and thus, a substantially equal subject image is detected. Resolution of focus detection can be improved by performing interpolation processing with respect to signals of rows skipped in both of these scans. In this case, a difference in accumulation time between scan 1 and scan 2 is corrected by gain processing or the like and is used.

Due to the fact that scans are selectively used in this way for each selected row in accordance with a pupil-divided direction for autofocus, even in a case where pupil division is performed in the vertical direction and even in a case where a subject is moving, a subject position shift can be suppressed, and accuracy of focus detection can be improved.

Third Embodiment

Figure 11:
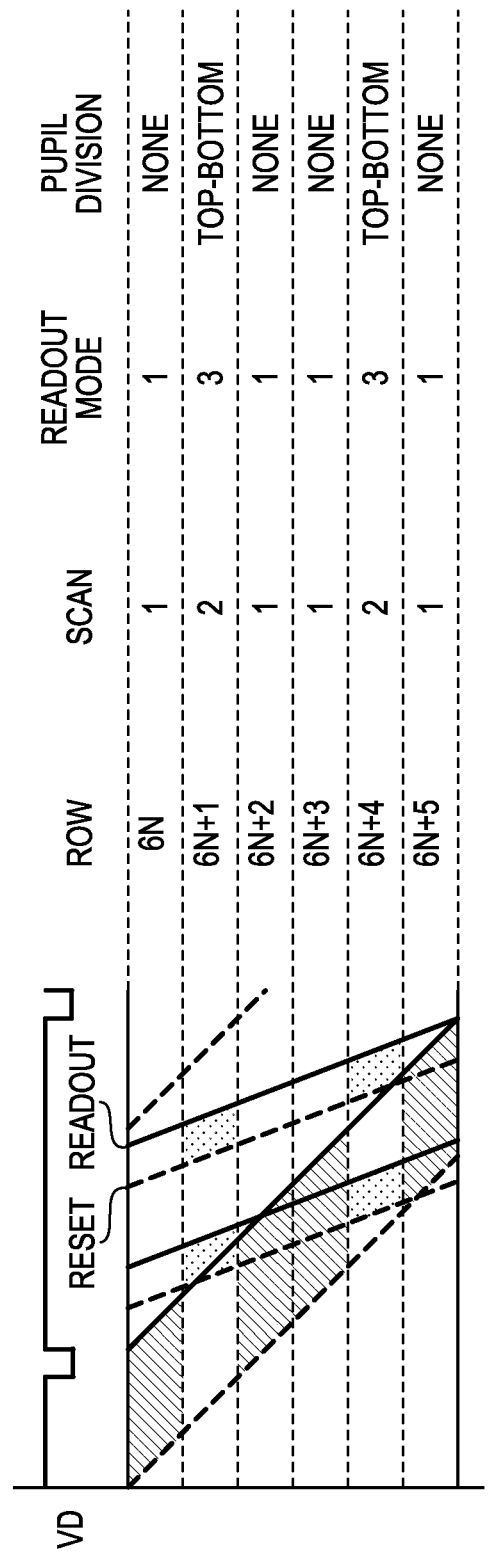
FIG. 11 is a conceptual view illustrating a vertical scan and a pupil-divided direction in a third embodiment.

FIG. 11 is a conceptual view explaining relationship between a read-out scan and a pupil-divided direction in a readout operation of a pixel signal in a third embodiment. In FIG. 11, six rows of pixels are illustrated as an example, and the case where a read-out scan is sequentially performed in units of row.

In FIG. 11, row numbers 6N, 6N+2, 6N+3, and 6N+5 each indicate a row for obtaining only an image signal, and these are expressed as a first pixel group. Row numbers 6N+1 and 6N+4 each indicate a row for obtaining a phase-difference signal by performing pupil division in the top-bottom direction, and these are expressed as a second pixel group.

In the third embodiment, signals of the first pixel group are read out via a column output line 105A in a first readout mode, and this is expressed as scan 1. Equally, signals of the second pixel group are read out via a column output line 105B in a third readout mode, and this is expressed as scan 2.

Note that a left figure of FIG. 11 is the same as that in FIG. 9, and thus, explanation of processing in the left figure of FIG. 11 will be omitted.

In scan 1, thinning readout of the four rows among the six rows is performed for the purpose of live view image capturing of an image capturing apparatus 100. On the other hand, in scan 2, thinning readout of the two rows among the six rows is performed with emphasis on a frame rate, for the purpose of focus detection in the top-bottom direction.

As described above, in the third embodiment, scan 1 is performed without pupil division, and scan 2 is performed with pupil division in the top-bottom direction, and thus, focus detection can be performed only with scan 2. No phase-difference signal is read out in scan 1, and thus, improvement in a frame rate can be achieved, or reduction in power consumption can be achieved by power saving during blanking.

In scan 2, pixel signals of rows skipped in scan 1 are read out, and the number of signal readout rows is less than that in scan 1, and thus, a phase-difference signal can be acquired at a high speed. Thus, in scan 2, a decrease in focus detection accuracy due to a subject moving at a high speed can be suppressed.

Due to the fact that scans are selectively used in this way for each selected row in accordance with a pupil-divided direction for autofocus, even in a case where pupil division is performed in the vertical direction and even in a case where a subject is moving, a subject position shift can be suppressed, and accuracy of focus detection can be improved.

Modification Example of Third Embodiment

As described above, in the third embodiment, scan 2 is performed with pupil division in the top-bottom direction, but this can also be performed with pupil division in the left-right direction. Further, a configuration in which a pupil-divided direction is changed depending on an imaging frame may be adopted such that, for instance, pupil division in the top-bottom direction is applied in a first frame of scan 2, and pupil division in the left-right direction is applied in a second frame of scan 2. In this way, focus detection can be performed regardless of an image direction of a subject.

Fourth Embodiment

Figure 12A:
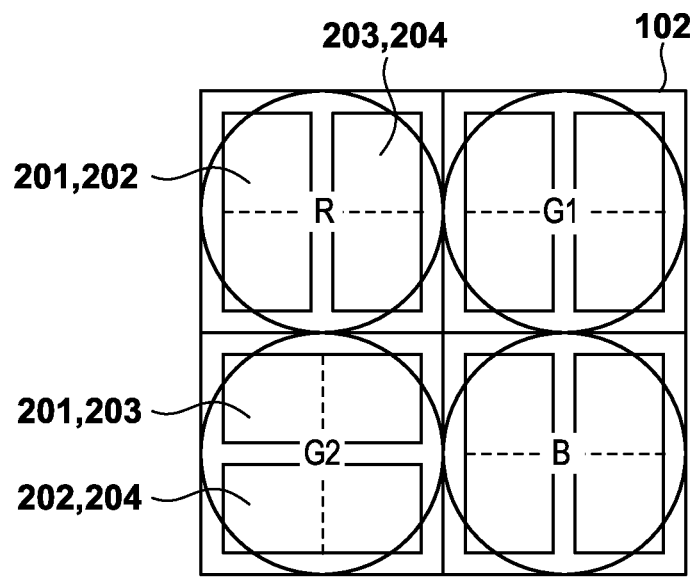
FIGS. 12A and 12B are configuration diagrams of pixels in a fourth embodiment.
Figure 12B:
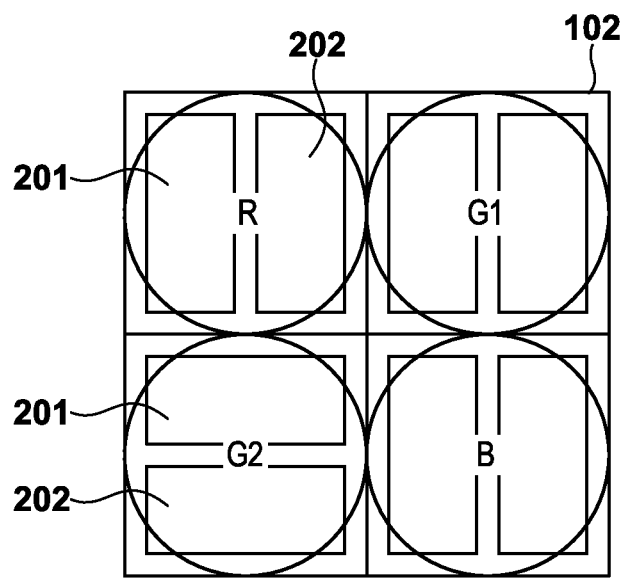

FIGS. 12A and 12B are figures illustrating configurations of pixels according to a fourth embodiment. In FIGS. 12A and 12B, in a unit pixel array (four pixels) that is a Bayer array, a pixel 102 of pupil division in the left-right direction (row direction) and a pixel 102 of pupil division in the top-bottom direction (column direction) coexist. In this example, the pixels 102 denoted by R, G1, and B include red, green, and blue color filters, respectively, and are subjected to pupil division in the left-right direction. The pixel 102 denoted by G2 includes a green color filter, and is subjected to pupil division in the top-bottom direction.

As illustrated in FIG. 12A, subpixels 201, 202, 203, and 204 obtained by dividing one unit pixel 102 by four are selectively read for each pixel 102 as a pupil division pixel in any of the left-right direction and the top-bottom direction, by control of transfer pulses PTXA, PTXB, PTXC, and PTXD.

For instance, wiring lines may be connected such that a transfer switch 302B of the subpixel 202 of the pixel G2 is controlled by the transfer pulse PTXC and a transfer switch 302C of the subpixel 203 is controlled by the transfer pulse PTXB. In this case, phase-difference signals of the pixels R, G1, and B and the pixel G2 are always read out in different directions.

Alternatively, two or more signal lines may be disposed in the transfer switches 302 of the subpixels 202 and 203, and a transfer pulse different for each of the unit pixels R, G1, G2, and B may be connected. In this case, the transfer pulses of the subpixels 202 and 203 are individually controlled for each of the unit pixels R, G1, G2, and B, and thus, phase-difference signals of both the left-right direction and the top-bottom direction can be read out in a single scan.

Furthermore, as illustrated in FIG. 12B, a configuration in which subpixels are formed by simply dividing one unit pixel 102 by two instead of four and in which a pixel 102 of pupil division in the left-right direction and a pixel 102 of pupil division in the top-bottom direction coexist in each unit pixel array may be adopted. In this case, wiring lines are connected such that the transfer switch 302 of the subpixel 201 is controlled by the transfer pulse PTXA and the transfer switch 302 of the subpixel 202 is controlled by the transfer pulse PTXC, regardless of the unit pixels R, G1, G2, and B. Note that the transfer pulses PTXB and PTXD are not used.

In such a configuration, phase-difference signals of both the left-right direction and the top-bottom direction can be read out in a single scan in a row including the unit pixel G2.

FIG. 13 is a conceptual view explaining relationship between a read-out scan and a pupil-divided direction in a readout operation of a pixel signal in the fourth embodiment. In FIG. 13, six rows of unit pixels are illustrated as an example, and the case where a read-out scan is sequentially performed in units of row is illustrated.

In FIG. 13, row numbers 6N, 6N+2, 6N+3, and 6N+5 each indicate a row for obtaining a phase-difference signal, and these are expressed as a first pixel group. Row numbers 6N+1 and 6N+4 each indicate a row for obtaining only an image signal, and these are expressed as a second pixel group.

In the fourth embodiment, signals of the first pixel group are read out via the column output line 105A in a second readout mode, and this is expressed as scan 1. Equally, signals of the second pixel group are read out via the column output line 105B in a first readout mode, and this is expressed as scan 2.

Note that a left figure of FIG. 13 is the same as that in FIG. 9, and thus, explanation of processing in the left figure of FIG. 13 will be omitted.

In scan 1, thinning readout of the four rows among the six rows is performed for the purpose of live view image capturing and of focus detection in the left-right direction and the top-bottom direction of the image capturing apparatus. On the other hand, in scan 2, thinning readout of the two rows among the six rows is performed with emphasis on a frame rate. Further, according to the configurations illustrated in FIGS. 12A and 12B, in the 6N and 6N+2 rows, a phase-difference signal of the left-right direction is read out. Furthermore, in a column including the unit pixels G2 of the 6N+3 and 6N+5 rows, a phase-difference signal of the top-bottom direction is read out, and in a column including the pixels B of the 6N+3 and 6N+5 rows, a phase-difference signal of the left-right direction is read out.

As described above, in the fourth embodiment, a physical configuration of a unit pixel is a configuration in which phase-difference signals of both the left-right direction and the top-bottom direction can already be output. Thus, in scan 1, a decrease in focus detection accuracy due to an image direction of a subject can be suppressed. In scan 2, pixel signals of rows skipped in scan 1 are read out, and the number of signal readout rows is less than that in scan 1, and no phase-difference signal is further read out, and thus, a phase-difference signal can be acquired at a high speed. In scan 1, a phase-difference signal also serves as an image signal, and thus, an image signal obtained in scan 2 is not necessarily used for a display image. For instance, the image signal obtained in scan 2 may be used as a photometric signal for light modulation, flicker detection, or the like.

Due to the fact that scans are selectively used in this way for each selected row in accordance with a pupil-divided direction for autofocus, accuracy of focus detection can be improved regardless of an image direction of a subject.

Note that the operations described in the above-described embodiments are selectively used depending on a property of a subject and each type of mode of the image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-169849, filed Oct. 15, 2021, which is hereby incorporated by reference herein in its entirety.

What is claimed is:

1. An image capturing apparatus comprising:
a pixel array in which pixels are arranged in a matrix and in which a plurality of column output lines including a first column output line and a second column output line are arranged for each column of the pixels of a plurality of pixel columns; and
a readout circuit configured to read out signals from the pixels via the plurality of column output lines,
wherein the readout circuit performs a first read-out scan of reading out signals via the first column output line from a first pixel group of the pixel array, and a second read-out scan of reading out signals via the second column output line from a second pixel group different from the first pixel group of the pixel array, and the readout circuit reads out a phase-difference signal of a horizontal direction by the first read-out scan, and reads out a phase-difference signal of a vertical direction by the second read-out scan.

2. The image capturing apparatus according to claim 1, wherein the readout circuit reads out both the phase-difference signal of the horizontal direction and a phase-difference signal of a vertical direction by the first read-out scan, and reads out the phase-difference signal of the vertical direction by the second read-out scan.

3. The image capturing apparatus according to claim 1, wherein the readout circuit reads out both the phase-difference signal of the horizontal direction and a phase-difference signal of a vertical direction by the first read-out scan, and reads out both a phase-difference signal of a horizontal direction and the phase-difference signal of the vertical direction by the second read-out scan.

4. The image capturing apparatus according to claim 1, wherein the readout circuit further reads out an image signal by the first read-out scan.

5. The image capturing apparatus according to claim 1, wherein the readout circuit further reads out an image signal by the second read-out scan.

6. The image capturing apparatus according to claim 1, further comprising at least one processor or circuit configured to function as a focus adjusting unit configured to perform focus adjustment by combining the phase-difference signal of the horizontal direction or a phase-difference signal of a vertical direction that are read out by the first read-out scan, with at least one phase-difference signal of an equal pupil-divided direction of a phase-difference signal of a horizontal direction or the phase-difference signal of the vertical direction that are read out by the second read-out scan.

7. An image capturing apparatus comprising:
a pixel array in which pixels are arranged in a matrix and in which a plurality of column output lines including a first column output line and a second column output line are arranged for each column of the pixels of a plurality of pixel columns; and
a readout circuit configured to read out signals from the pixels via the plurality of column output lines,
wherein the readout circuit performs a first read-out scan of reading out signals via the first column output line from a first pixel group of the pixel array, and a second read-out scan of reading out signals via the second column output line from a second pixel group different from the first pixel group of the pixel array, and the readout circuit reads out an image signal by the first read-out scan, and reads out a phase-difference signal by the second read-out scan.

8. The image capturing apparatus according to claim 7, wherein the readout circuit reads out both an image signal and the phase-difference signal by the first read-out scan.

9. The image capturing apparatus according to claim 7, wherein the readout circuit reads out the phase-difference signal of a vertical direction by the second read-out scan.

10. An image capturing apparatus comprising:
a pixel array in which pixels are arranged in a matrix and in which a plurality of column output lines including a first column output line and a second column output line are arranged for each column of the pixels of a plurality of pixel columns; and
a readout circuit configured to read out signals from the pixels via the plurality of column output lines,
wherein the readout circuit performs a first read-out scan of reading out signals via the first column output line from a first pixel group of the pixel array, and a second read-out scan of reading out signals via the second column output line from a second pixel group different from the first pixel group of the pixel array, and the readout circuit reads out a phase-difference signal by the first read-out scan, and reads out a photometric signal by the second read-out scan.

11. The image capturing apparatus according to claim 10, wherein the readout circuit reads out the phase-difference signal of a horizontal direction by the first read-out scan.

12. The image capturing apparatus according to claim 10, wherein the readout circuit reads out the phase-difference signal of a vertical direction by the first read-out scan.

13. The image capturing apparatus according to claim 10, wherein the readout circuit reads out an image signal together with the phase-difference signal by the first read-out scan.

* * * * *